(12) United States Patent  (10) Patent No.: US 8,661,279 B2
Goodrum et al.  (45) Date of Patent: Feb. 25, 2014

(54) POWER CAPPING USING C-STATES (75) Inventors: Alan L. Goodrum, Tomball, TX (US); Scott Patrick Faasse, Tomball, TX (US); Darren John Cepulis, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 286 days.

(21) Appl. No.: 13/185,799

(22) Filed: Jul. 19, 2011

(65) Prior Publication Data

US 2013/0024708 A1  Jan. 24, 2013

(51) Int. Cl.
*G06F 1/26* (2006.01)
*G06F 1/32* (2006.01)

(52) U.S. Cl.
USPC ........... 713/323; 713/300; 713/320; 713/322; 713/340

(58) Field of Classification Search
USPC .......................... 713/300, 320, 322, 323, 340
See application file for complete search history.

(56) References Cited

U.S. PATENT DOCUMENTS

| 8,255,709 | B2* | 8/2012 | McCarthy et al. | 713/300 |
| 2005/0138443 | A1 | 6/2005 | Cooper | |
| 2006/0095807 | A1* | 5/2006 | Grochowski et al. | 713/324 |
| 2008/0077817 | A1* | 3/2008 | Brundridge et al. | 713/340 |
| 2009/0031157 | A1* | 1/2009 | Yap | 713/340 |
| 2009/0158067 | A1 | 6/2009 | Bodas et al. | |
| 2010/0268968 | A1 | 10/2010 | Ghiasi et al. | |
| 2010/0306768 | A1 | 12/2010 | Khatri et al. | |
| 2010/0332856 | A1 | 12/2010 | Song | |
| 2011/0022857 | A1* | 1/2011 | Nussbaum et al. | 713/300 |
| 2011/0022868 | A1 | 1/2011 | Harchol-Balter et al. | |
| 2011/0178652 | A1* | 7/2011 | Carter et al. | 700/296 |
| 2011/0185203 | A1* | 7/2011 | Carlson et al. | 713/320 |
| 2013/0061064 | A1* | 3/2013 | Ananthakrishnan et al. | 713/300 |

* cited by examiner

*Primary Examiner* — Vincent Tran (57) ABSTRACT

An example system includes a power capping controller to assert an output based on exceeding a power threshold for a computer system. A central processing unit (CPU) core is provided to enter a low-power C-state based on the output being asserted via a control path that bypasses an operating system command.

14 Claims, 7 Drawing Sheets

POWER CAPPING USING C-STATES

BACKGROUND

Efforts are being made to control usage of power and cooling resources in data centers and like infrastructure. This can be achieved to maintain operation within predefined power constraints, such as may be based on the amount of power capacity available for information technology operations. This constraint can be imposed by local utilities or be determined according to system requirements and available cooling resources. If available power is not used efficiently, it can cause undesired increases in cost. In extreme cases, failure to cap power properly can cause power overload and, potentially, a power supply shutdown or a circuit breaker trip.

DETAILED DESCRIPTION

Figure 1:
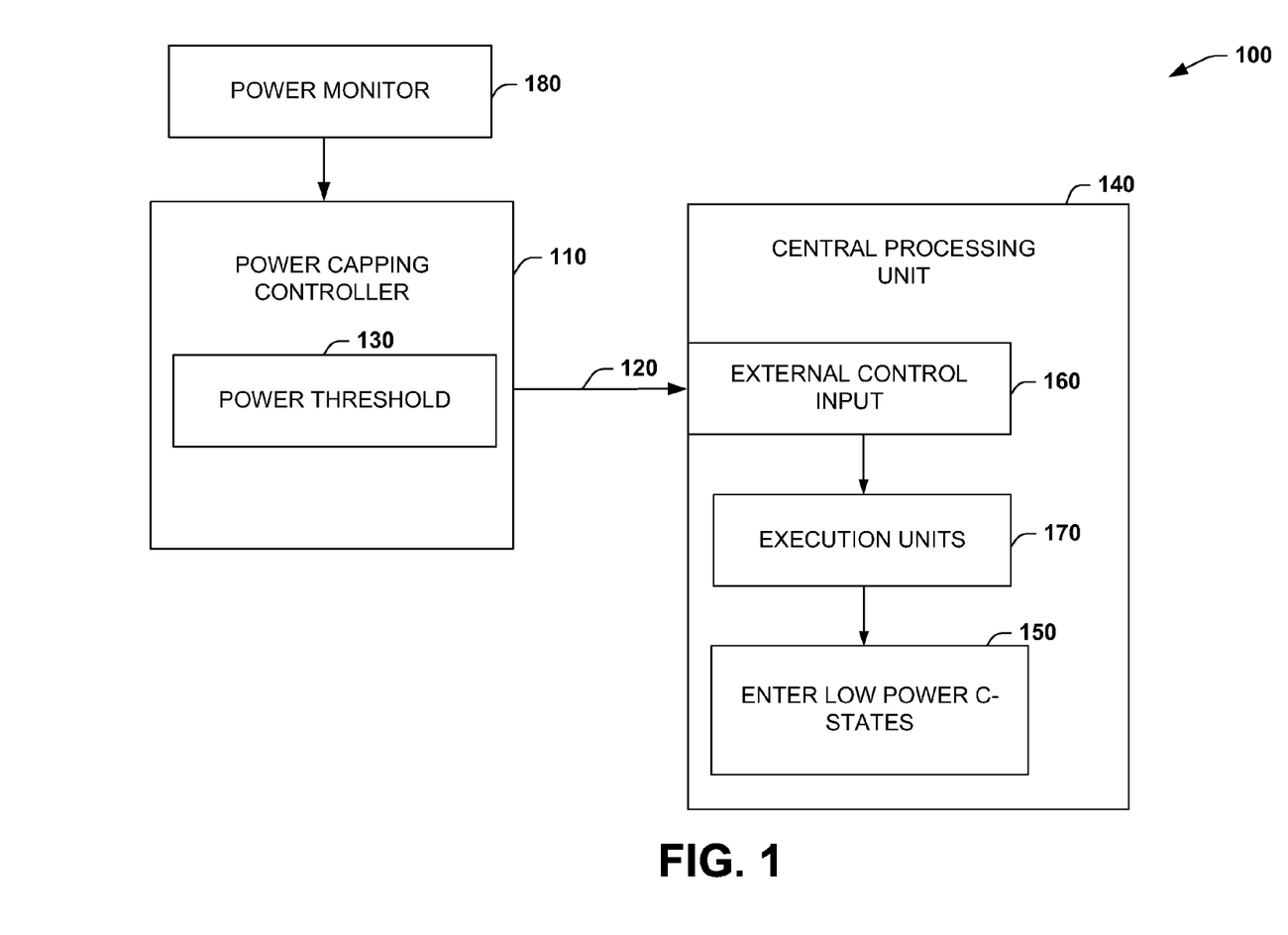
FIG. 1 illustrates an example of a power capping system.

FIG. 1 illustrates an example of a power capping system 100. The system 100 includes a power capping controller 110 to assert an output 120 based on exceeding a power threshold 130 for a computer system. The computer system can include a single computer, a server, or a plurality of servers (e.g., a server farm). A central processing unit (CPU) 140 enters a low-power C-state 150 based on the output 120 being asserted. The CPU 140 can include one or more CPU cores. Assertion of the output 120 causes a core of the CPU 140 to enter the low power state by bypassing the control path for an operating system command.

For example, an external control input 160 responds to the output 120 from the capping controller 110. When received (e.g., output 120 asserted or de-asserted), the external control input 160 disables or enables various execution units 170 within the core of the CPU 140. Thus, the external control input 160 bypasses operating system commands to enable power capping control outside of the operating system or external to the operating system. This enables faster entry into the low-power C-states 150 by the CPU 140 since the operating system is no longer responsible for entry into the respective low-power states.

The system 100 includes a power monitor 180 to determine a level of power consumption by computer system (e.g., a server), with the power capping controller 110 asserting the output 120 based on the level of power consumption exceeding the power threshold 130. The CPU 140 can be part of a server system as described below where the power monitor 180 measures power of the server including the CPU. The power threshold can be set to a fixed threshold or it can be variable, such as can be set based on expected power requirements for the computer system. For example, if the power threshold 130 were set to 500 Watts and the power monitor 180 detected the system power exceeded 500 Watts, then the output 120 could be asserted to cause the CPU cores to enter a low power C-state at 150 without also requiring operating system intervention to achieve such state. The output of the power capping controller 110 can modulate the output 120 (e.g., via pulse width modulation) to provide for modulated control between a current power state and the low power C-state. The amount of modulation can be set according to the amount by which the uncontrolled power usage would otherwise have exceeded the power threshold 130.

When the capping controller 110 asserts the output 120 to inform the CPU 140 to reduce performance to the low-power level for example, this signal is routed internal to CPU cores to the instruction execution units 170, and at the next instruction boundary, for example, those units behave as if an idle instruction were executed. Thus, when the external control input 160 is asserted, the cores enter the idle state approximately in unison, and the CPU 140 takes the appropriate action as if the operating system had executed the idle instruction on each core, thereby reducing the power to the C-state idle power. Processor designers often also implement deeper idle states for the support logic around the cores when all the cores are idle (e.g., so no CPU snoop traffic, and so forth, will be required). Such deeper idle states can be referred to as a "package C-state." Since the system 100 can force all cores to go idle in unison, the package can then enter the deepest package C-state. In many instances, the CPU designer can implement multiple C-states with varying power consumption and wake latency. Various power capping implementations might employ these various C-states. As used herein, a low power C-states that can be utilized in the system 100 may include C1, C2, C3, C4, C5, C6, and so forth, for example. The particular low power C-state utilized by the capping system 100 can vary depending on the configuration of the CPU 140. For example, when multiple low power C-states are available for the CPU 140, the capping controller 110 can be configured to assert the output 120 (e.g., with a value or instruction) to select a desired one of low-power C-states from the plurality of low-power C-states. The capping controller 110 can select a given C-state based on the level of power consumption, such as determined by the power monitor 180. Alternatively, the capping controller can assert the output 120 to enter the C-state and the selection of which C-state to enter can be implemented by instructions executed by the CPU 140.

During development of the capping system 100, the system designer may select a frequency at which to modulate the output 120 and the range of duty cycles to use based on the entry and exit latency of the selected C-state. In one example, higher C-states with shorter wake latency may be desirable to allow for higher frequency modulation of the output 120, or they may utilize the deepest C-state and operate at lower modulation frequencies. Alternatively or additionally, the capping controller 110 could have multiple connections (e.g., pins) to the CPU 140, one for each available C-state with its own wake latency requirements, and modulate different pins depending upon how long the capping controller plans to keep the pin asserted. As yet another example, the capping controller 110 might have access to multiple C-states but only one C-state and its associated minimum pulse width is selected to be used, based on design trade-offs, for example.

The capping controller 110 with access to CPU 140 C-states could be located physically outside the CPU or it (or a portion thereof) could be inside the CPU package itself. A suitable location for the capping controller 110 may be a function of the number and type of interface signals that are required. If the interface to the CPU 140 is limited to a single binary selection of the normal running state and the lowest C-state for example, then the capping controller 110 can remain external to the CPU 140. However, if there are multiple connections to the cores to use multiple C-states for varying purposes, and if varying P-states, and so forth are also used, then integrating some or all of the capping controller 110 inside the CPU 140 can reduce the number of interface pins required between the CPU and analog circuits outside the CPU that measure system power such as in the power monitor 180.

In some cases, an interrupt could normally force the CPU 140 to exit the C-state and resume execution of instructions. In another example, it may be desirable to mask the interrupt inside and not have it cause the CPU 140 to leave the C-state. In another configuration, the system can externally synchronize the interrupt to the PWM (as described below). Yet another example masks the PWM with the interrupt.

To minimize the effects of capping on system management interrupt (SMI) routines, the capping controller 110 can synchronize the capping pulse width modulated (PWM) signal and the SMI signal. If it is time to run some SMI code, synchronizing the two signals would allow the SMI code to be run first after the capping signal de-asserts. Since SMI routines are typically designed to complete in <1 ms, the SMI routine can run without interference from capping if the signals are synchronized and the minimum de-asserted pulse width is kept >1 ms, for example. Alternatively, power capping can take precedence over other CPU operations.

For purposes of simplification of explanation, in the present example, different components of the system 100 are illustrated and described as performing different functions. However, one of ordinary skill in the art will understand and appreciate that the functions of the described components can be performed by different components, and the functionality of several components can be combined and executed on a single component. The components can be implemented, for example, as computer executable instructions (e.g., software, firmware), hardware (e.g., CPU, an application specific integrated circuit), or as a combination of both. In other examples, the components could be distributed among remote devices across a network, for example.

Figure 2:
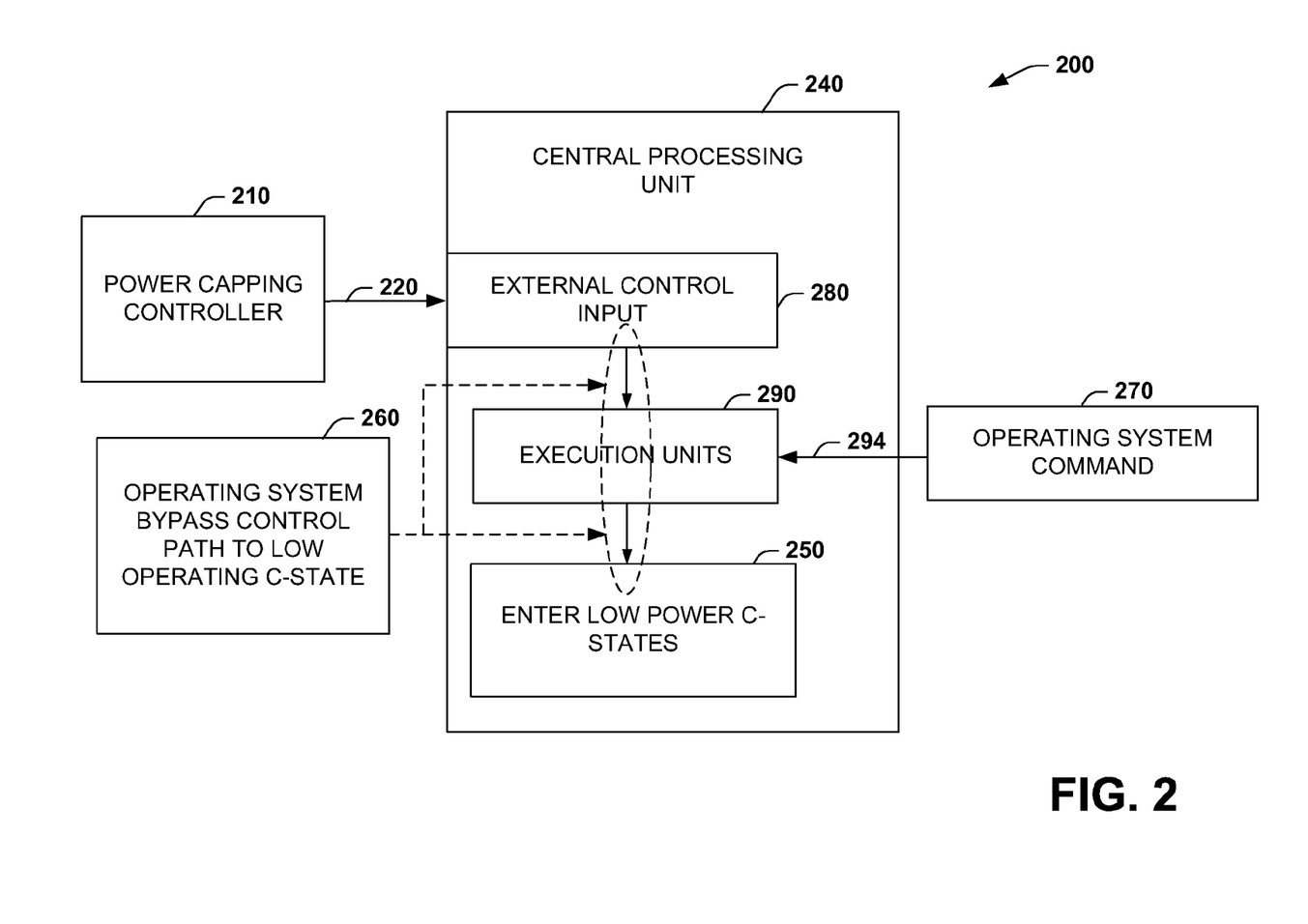
FIG. 2 illustrates an example of a control path for a power capping system.

FIG. 2 illustrates an example of a bypass control path for a power capping system. The system 200 includes a power capping controller 210 to assert an output 220 if power cap threshold for the system is exceeded. A central processing unit (CPU) 240 enters a low-power C-state 250 based on the output 220 being asserted. In the example of FIG. 2, a bypass control path, schematically demonstrated at 260, controls the CPU 240 into the low power C-state without requiring an operating system command 270.

For example, an external control input 280 responds to the output 220 from the capping controller 210 while bypassing control of the operating system command 270. When received (e.g., output 220 asserted or de-asserted), the external control input 280 disables or enables various execution units 290 within the CPU 240. Thus, the external control input 280 enables bypassing operating system commands 270 to provide power control outside of the operating system control. It is to be appreciated that in some applications, the operating system commands 270 may also be able to control the execution units 290 via signal 294.

In one example, power capping controller 210 modulates CPU operation between a low-power C-state and a normal (e.g., power-consuming) operating state. The external control input 280 associated with the CPU 240 thus can enable or disable the execution unit 290 outside of an operating system command 270 to facilitate the modulation between the low-power C-state 250 and the normal operating state. The CPU 240 can include a plurality of execution units 290 which are also referred to as CPU cores, each of the plurality of CPU cores modulating its operation between the low-power C-state 250 and a normal operating state. The external control input 280 can be associated with a serial or parallel control to enable or disable the execution unit 290. Alternatively or additionally, the external control input 280 can be utilized to select a desired C-state 250 according to instruction in the output 220 from a set of available C-states, such as disclosed herein. In another example, the external control input 280 can be employed as a signal to indicate that a low power C-State should entered, but the decision as to which C-State is entered is left to the CPU 240. For example, the determination of the C-state to be used is chosen by computer executable instructions running on the CPU 240. Thus, the direction to enter into the C-state is external via control input 280, but the choice of which C-state to utilize can be programmatically performed internally or externally.

Figure 3:
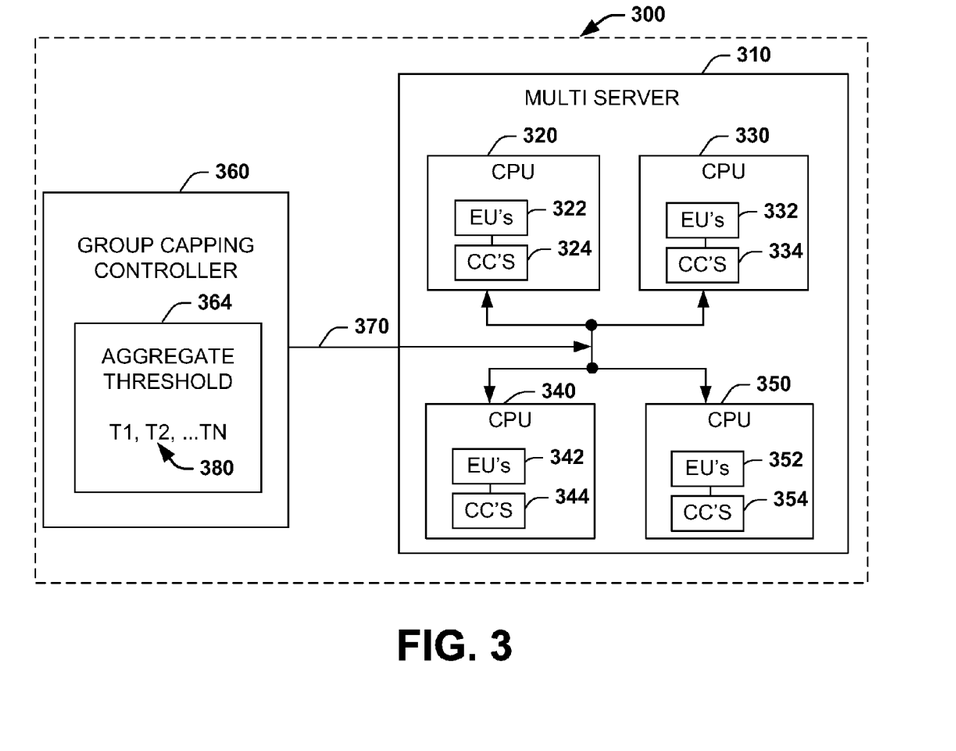
FIG. 3 illustrates an example of multi server controls for a power capping system.

FIG. 3 illustrates an example of multi server controls for a power capping system 300. The system 300 includes a group or collection of servers at 310 and shown as CPU 1 at 320 having execution unit 322 and capping controller 324, CPU 2 at 330 having execution unit 332 and capping controller 334, CPU 3 at 340 having execution unit 342 and 344, and CPU N at 350 having execution unit 352 and capping controller 354, where N is a positive integer representing a number of servers. The CPU's 320-350 can include multiple execution units or cores and although the capping controllers are shown inside the respective CPU's, the capping controllers are often provided as external power capping controls to the CPU. The CPU's 310 can be implemented in any number of one or more computer systems, typically co-located in a given facility. A group capping controller 360 can control a power state (place servers in low power C-State) of the CPU's 320-350 according to an aggregate threshold 364 and via output control 370, where the output 370 signals to the capping controllers 324, 334, 344, and 354 to circumvent operating system controls to the respective execution units 322, 332, 342, and 354 as described herein. The group capping controller 360 can signal via its output 370 (can be multiple outputs at 370 to control individual capping controllers) to cause one or more of the plurality of CPU's to enter into its low-power C-state via bypass commands asserted by the individual capping controllers 324, 334, 344, and 354. For example, in the server configuration 310, each of the servers can include a plurality of CPU cores which are also referred to as execution units, with a power cap being assigned to each of the servers in the group of servers, which collectively defines a group power cap. Also, the group capping controller 360 can dynamically adjust the power cap for the group of servers at 310, such as based on expected power consumption determined for each of the servers and available power resources.

In one example, the aggregate threshold 364 includes individual core thresholds shown at 380 T1, T2, through TN, where N is a positive integer correlating to the number of CPU's 320-350. The group capping controller 360 can control total system power by dynamically adjusting caps via the individual thresholds 380. Thus, if one CPU were operating below its allocated cap and another CPU were exceeding its respective cap, the group capping controller 360 could adjust the respective caps to minimize one power allocation in favor of another while still maintaining total system power below the aggregate threshold 364. Reductions in CPU power can be significant in the total server power. Low minimum capping power is desirable for systems that automatically adjust the power of multiple servers in a group that share a single group power cap such as can be defined by the aggregate threshold 380.

When a server's workload drops, the group controller 360 can lower that server's cap before it can allocate that power to other, busier servers in the group. If a server enters idle, its power consumption can drop to one of the low power C-states. However, if the capping controller for an individual server cannot cap the respective server that low, the group controller 360 cannot depend on that server staying in that low-power state, and so it should leave some fraction of the group power budget allocated to that idle server, even though the server could be consuming less power. However, if the capping controller can cap the server near its C-state idle power level, then even if new workload arrives and forces the server out of the idle state, the power may not rise appreciably until the group controller 360 notices the demand for more power and raises the cap via the individual thresholds 380.

Figure 4:
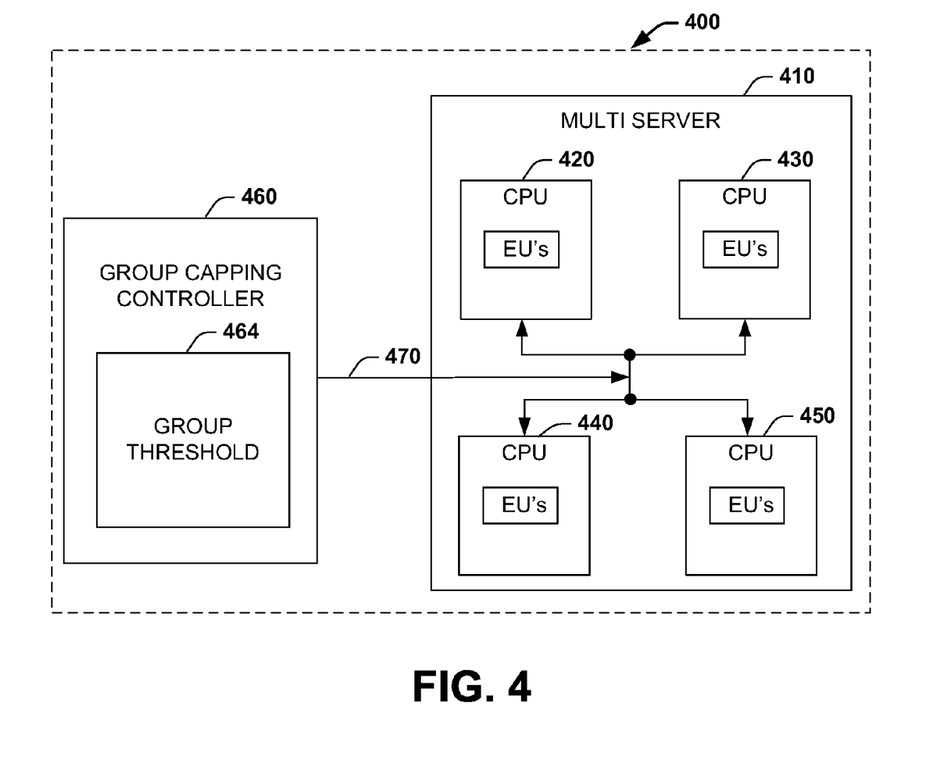
FIG. 4 illustrates an alternative example of multi server controls for a power capping system.

Referring to FIG. 4, an alternative example system 400 is illustrated. In this example, multi CPU's are shown at 420-450. The CPU's 420-450 are not associated with individual capping controllers but are controlled by a single group controller 460 having a group threshold 464 and control output 470 that can place each of the CPU's in the low power state in a concurrent manner. The system 400 enables lower minimum power caps for a server, where a given CPU associated with the server may be the single largest consumer of power in the system.

Figure 5:
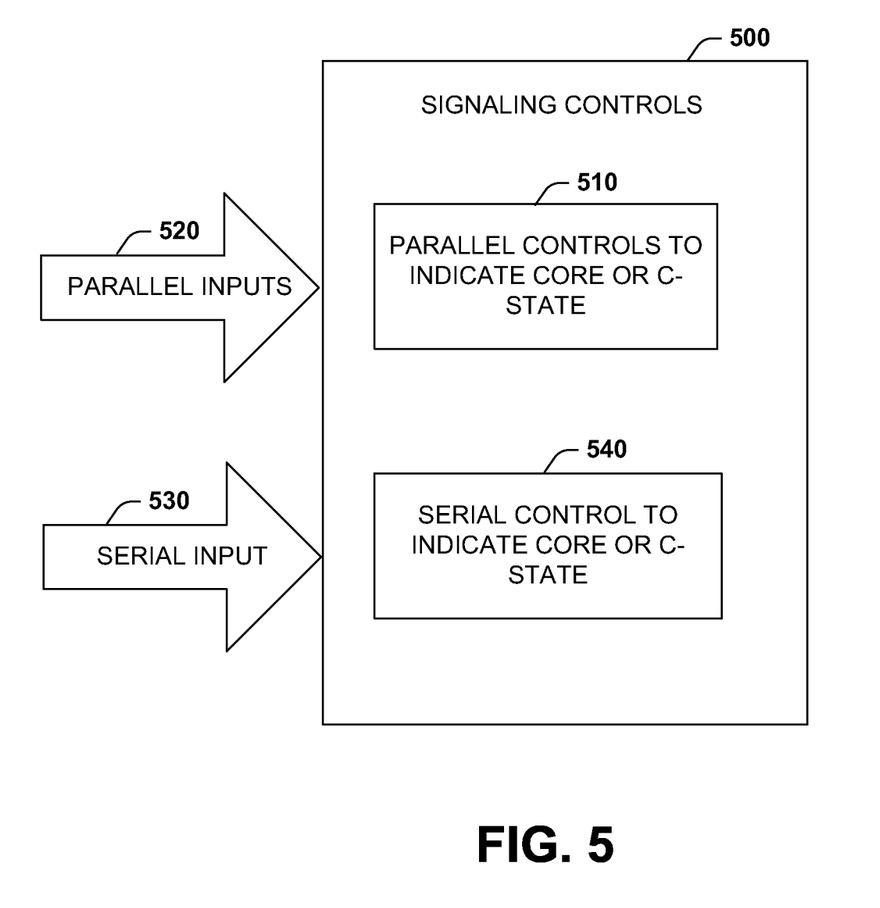
FIG. 5 illustrates an example of parallel or serial signaling controls for a power capping system.

FIG. 5 illustrates an example of parallel or serial signaling controls 500 for a power capping system. As shown, the signaling controls 500 can include parallel controls to drive core and/or C-state levels at 510. For example, two or more parallel inputs at 520 can be asserted by a capping controller to indicate a respective core to place into a low-power C-state or to signal which C-state to enter, or to signal the core to enter the low-power state and which respective C-state the core should enter. For example, the parallel inputs 420 may include code that instructs a proper subset of the cores (e.g., less than all cores) to enter a low-power C-state. Additionally or alternatively, the code provided via parallel inputs 420 (or a subsequent parallel code) may indicate which C-state one or more of the cores should enter, for example. The code can cause different selected cores to enter different low power C-states according to power capping requirements.

A serial input 530 may drive a serial control shown at 540. For example, a power capping controller (not shown—see, e.g., FIGS. 1-4) can modulate the serial input 530 by repeatedly asserting and de-asserting the input over a time period such that the amount of time that the CPU core operates in the low-power C-state is modulated accordingly. To further the example, the power capping controller can control a duty cycle of the modulation based on an amount by which the computer system exceeds the power threshold as described above. The serial input 530 can also be employed by the power capping controller to signal a core to enter the low-power C-state or identify the low-power C-state to enter. For example, serial data at 530 can be used to signal which subset of cores out of a group of cores to send into a low-power state. Also, the serial data at 530 can be used to signal which C-state should be entered for each respective core.

Figure 6:
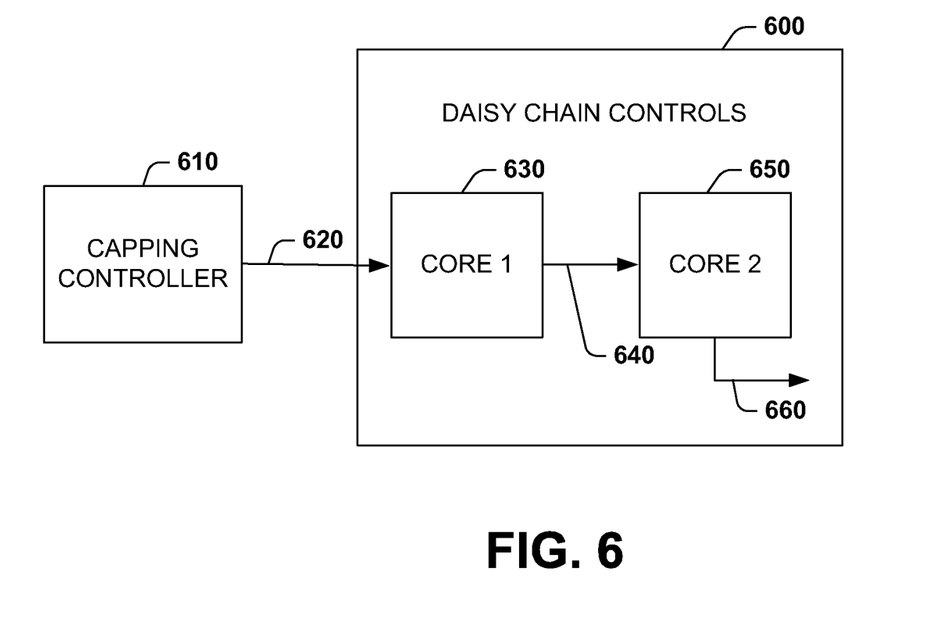
FIG. 6 illustrates an example of daisy chain controls for a power capping system.

FIG. 6 illustrates an example of daisy chain controls 600 that can be utilized for a power capping system. A capping controller 610 controls an external input 620 to a core 630, where such input 620 bypasses operating system controls as described herein. In this example, an output 640 from core 630 is employed to control a subsequent core 650. Thus, the output 640 can place the core at 650, into a respective low-power C-state. Although only two cores are shown in this example, other cores could similarly be signaled, such as shown at 660. The signaling between cores can employ parallel, serial or a combination of parallel and serial daisy chain power capping controls, for example.

Figure 7:
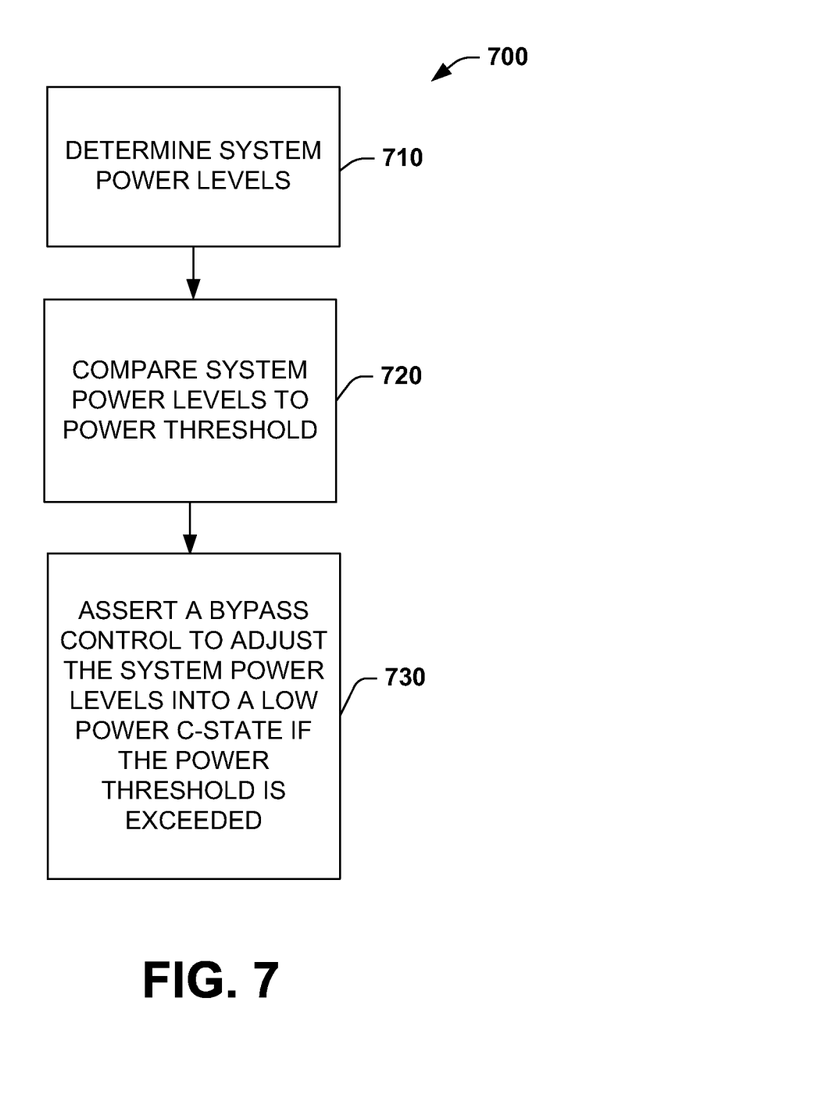
FIG. 7 illustrates an example method for performing power capping.

In view of the foregoing structural and functional features described above, example methods will be better appreciated with reference to FIGS. 7 and 8. While, for purposes of simplicity of explanation, the methods are shown and described as executing serially, it is to be understood and appreciated that the methods are not limited by the illustrated order, as parts of the methods could occur in different orders and/or concurrently from that shown and described herein. Such methods can be executed by a computer and associated equipment (e.g., power monitor), for example.

FIG. 7 illustrates an example method 700 for a power capping system. A method 700 includes determining system power levels at 710. For example, this can include monitoring voltage and/or current levels to determine power levels being consumed by a computer system (e.g., a server or server cluster). At 720, computer system power levels are compared to a power threshold. For example, this can include comparing power levels determined at 710 to a predetermined power threshold. The threshold can be fixed for the computer system or it can be variable, such as can be set by software controls. At 730, a method 700 includes asserting an operating system or software command bypass control to enter a low-power C-state if the power threshold is exceeded. As described herein, the bypass control can be routed directly to internal core units, such as execution units, for example to place such units in a low-power C-state. The bypass control can be provided via a dedicated hardware control input (e.g., serial or parallel), thus forcing a processor core into a low power C-state without operating system intervention.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
   a power capping controller to assert an output based on exceeding a power threshold for a computer system, and
   a central processing unit (CPU) core to enter a low-power C-state based on the output being asserted via a control path that bypasses a software command,
   wherein the power capping controller modulates the output by repeatedly asserting and de-asserting the output over a time period such that the amount of time that the CPU operates in the low-power C-state is modulated accordingly.

2. The system of claim 1, further comprising a power monitor to determine a level of power consumption, the power capping controller asserting the output based on the level of power consumption exceeding the power threshold.

3. The system of claim 1, wherein the CPU core comprises a plurality of CPU cores, a core of the plurality of CPU cores operating in the low-power C-state based on the output being asserted.

4. The system of claim 3, further comprising a group of servers, each of the servers comprising a plurality of CPU cores, a server power threshold being assigned to each of the servers in the group of servers to control entering the plurality of CPU cores of each server into a low-power C-state thereof.

5. The system of claim 4, further comprising a group controller to dynamically allocate power to CPU cores of each of the servers in the group by selectively adjusting the server power threshold for each of the servers.

6. The system of claim 1, wherein the power capping controller controls a duty cycle of the modulation based on an amount by which the computer system exceeds the power threshold.

7. The system of claim 6, wherein the power capping controller signals a core to enter the low-power C-state or identifies the low-power C-state to enter based on an external control input of the CPU, the external control input of the CPU receiving a serial control signal or a parallel control signal.

8. The system of claim 1, wherein the low-power C-state comprises a plurality of low-power C-states, the capping controller asserting the output to select a desired low-power C-state from the plurality of low-power C-states.

9. A processor, comprising:
  a central processing unit (CPU) to modulate its operation between a low-power C-state and a normal operating state of an execution unit; and
  an external control input associated with the CPU to control the execution unit outside of a software command to modulate the CPU between the low-power C-state and the normal operating state, the external control input being repeatedly asserted and de-asserted over a time period such that the amount of time that the CPU operates in the low-power C-state is modulated accordingly.

10. The processor of claim 9, wherein the CPU comprises a plurality of CPU cores, each of the plurality of CPU cores modulating its operation between the low-power C-state and the normal operating state based on a command received at the external control input.

11. The processor of claim 10, the external control input comprises a serial or parallel control to enable or disable the execution unit or to select a desired C-state.

12. A method comprising:
  determining, by a computer, system power levels;
  comparing, by the computer, system power levels to a power threshold;
  asserting, by the computer, an operating system bypass control input to force a processor of the computer into a low power C-state if the power threshold is exceeded such that the system power levels are reduced without operating system intervention; and
  modulating, by the computer, the amount of time that the processor operates in the low-power C-state by repeatedly asserting and de-asserting the bypass control input over a time period.

13. The method of claim 12, further comprising controlling a duty cycle of the modulation based on an amount by which the processor exceeds the power threshold.

14. The method of claim 12, further comprising selectively controlling multiple cores into or out of the low power C-state via the bypass control input to adjust the system power levels to below the power threshold.

* * * * *